United States Patent
Zhou

(10) Patent No.: US 9,319,966 B2
(45) Date of Patent: Apr. 19, 2016

(54) ADDRESS PROCESSING METHOD, GATEWAY DEVICE, AND ACCESS POINT

(71) Applicant: Huawei Technologies Co., LTD, Shenzhen (CN)

(72) Inventor: Junping Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 14/109,219

(22) Filed: Dec. 17, 2013

(65) Prior Publication Data

US 2014/0126347 A1 May 8, 2014

Related U.S. Application Data

(63) Continuation of application No. PCT/CN2011/075880, filed on Jun. 17, 2011.

(51) Int. Cl.
*H04W 48/14* (2009.01)
*H04W 24/04* (2009.01)
*H04W 88/08* (2009.01)

(52) U.S. Cl.
CPC ............. *H04W 48/14* (2013.01); *H04W 24/04* (2013.01); *H04W 88/08* (2013.01)

(58) Field of Classification Search
CPC ..... H04W 48/00; H04W 48/08; H04W 48/14; H04W 88/08; H04W 88/12
See application file for complete search history.

(56) References Cited

U.S. PATENT DOCUMENTS

| 8,077,681 | B2 * | 12/2011 | Ahmavaara et al. | 370/338 |
| 2009/0141694 | A1 * | 6/2009 | Shi | H04L 41/0806 370/338 |
| 2011/0269465 | A1 * | 11/2011 | Xu et al. | 455/436 |
| 2012/0036557 | A1 | 2/2012 | Li | |

FOREIGN PATENT DOCUMENTS

| CN | 1972231 A | 5/2007 |
| CN | 101217440 A | 7/2008 |
| CN | 100486198 C | 5/2009 |
| CN | 101699918 A | 4/2010 |
| CN | 101771612 A | 7/2010 |
| CN | 101888630 A | 11/2010 |
| CN | 101895962 A | 11/2010 |
| CN | 101977423 A | 2/2011 |
| EP | 2451213 A1 | 5/2012 |

(Continued)

OTHER PUBLICATIONS

3rd Generation Partnership Project; Technical Specification Group Core Network and Terminals; Mobile radio interface Layer 3 specification; Core network protocols; Stage 3 (Release 10), 3GPP TS 24.008 V10.2.0, Mar. 2011, 634 pages.

(Continued)

*Primary Examiner* — Anh Ngoc Nguyen
(74) *Attorney, Agent, or Firm* — Slater & Matsil, L.L.P.

(57) ABSTRACT

Embodiments of the present invention relate to an address processing method, a gateway device, and an access point. An access point sends a request message to a gateway device. The access point obtains an address of an access controller from the gateway device. The address of the access controller is an address of an access controller selected by the gateway device. The access point establishes a CAPWAP tunnel with the access controller selected by the gateway device.

20 Claims, 5 Drawing Sheets

(56) References Cited

FOREIGN PATENT DOCUMENTS

| EP | 2469961 A1 | 6/2012 |
|---|---|---|
| WO | 2008034357 A1 | 3/2008 |
| WO | 2011000152 A1 | 1/2011 |

OTHER PUBLICATIONS

International Search Report and Written Opinion received in Application No. PCT/CN2011/075880 mailed Mar. 22, 2012, 13 pages.

* cited by examiner

ADDRESS PROCESSING METHOD, GATEWAY DEVICE, AND ACCESS POINT

This application is a continuation of International Application No. PCT/CN2011/075880, filed on Jun. 17, 2011, which is hereby incorporated by reference in its entirety.

TECHNICAL FIELD

Embodiments of the present invention relate to communication technologies, and in particular, to an address processing method, a gateway device, and a wireless access point (AP).

BACKGROUND

On a wireless local area network (WLAN), a wireless access point (AP) may provide a WLAN terminal with a wireless fidelity (Wi-Fi) access channel, and access an access controller (AC) through a wireless communication system network. An address of the AC is manually configured on the AP, and the AP can establish a control and provisioning of wireless access points (CAPWAP) tunnel with the AC, so that the WLAN terminal implements transmission of service data.

However, if the address of the AC is changed or a fault occurs on the AC, address reconfiguration needs to be manually performed on the AP where the address of the AC is configured, which results in complex operations and frequently causes errors, thereby reducing the efficiency and reliability of obtaining the address of the AC by the AP.

SUMMARY OF THE INVENTION

Embodiments of the present invention provide an address processing method, a gateway device, and an AP to increase the efficiency and reliability of obtaining an address of an AC by the AP.

One aspect of the present invention provides an address processing method. A gateway device receives a request message from an AP and selects an AC. The gateway device sends an address of the selected AC to the AP.

Another aspect of the present invention provides an address processing method. An AP sends a request message to a gateway device. The AP obtains an address of an AC from the gateway device. The address of the AC is an address of an AC selected by the gateway device. The AP establishes a CAPWAP tunnel with the AC selected by the gateway device.

Another aspect of the present invention provides a gateway device. A receiving unit is adapted to receive a request message from an AP. A selecting unit is adapted to select an AC. A sending unit is adapted to send an address of the AC selected by the selecting unit to the AP.

Another aspect of the present invention provides an AP. A requesting unit is adapted to send a request message to a gateway device. An obtaining unit is adapted to obtain an address of an AC from the gateway device. The address of the AC is an address of an AC selected by the gateway device. An establishing unit is adapted to establish a CAPWAP tunnel with the AC selected by the gateway device.

It can be seen from the foregoing technical solutions that, in the embodiments of the present invention, after a gateway device receives a request message from an AP, the gateway device selects an AC and sends an address of the selected AC to the AP, so that the AP can establish a CAPWAP tunnel with the AC selected by the gateway device. In this way, problems such as complex operations and frequent errors caused by manual address configuration on the AP in the prior art can be avoided, thereby increasing the efficiency and reliability of obtaining an address of an AC by the AP.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The technical solutions of the present invention may be applied in various wireless communication system networks, for example, a global system for mobile communications (GSM) network, a general packet radio service (GPRS) system network, a code division multiple access (CDMA) system network, a wideband code division multiple access (WCDMA) system network, a long term evolution (LTE) system network, a world interoperability for microwave access (WiMAX) system network, and the like.

A gateway device may be a gateway general packet radio service (GPRS) support node (GGSN) on the GSM system network, GPRS system network or WCDMA system network, a packet data serving node (PDSN) on the CDMA system network, a packet data network gateway (P-GW) on the LTE system network, or a home agent (HA) on the WiMAX system network.

Figure 1:
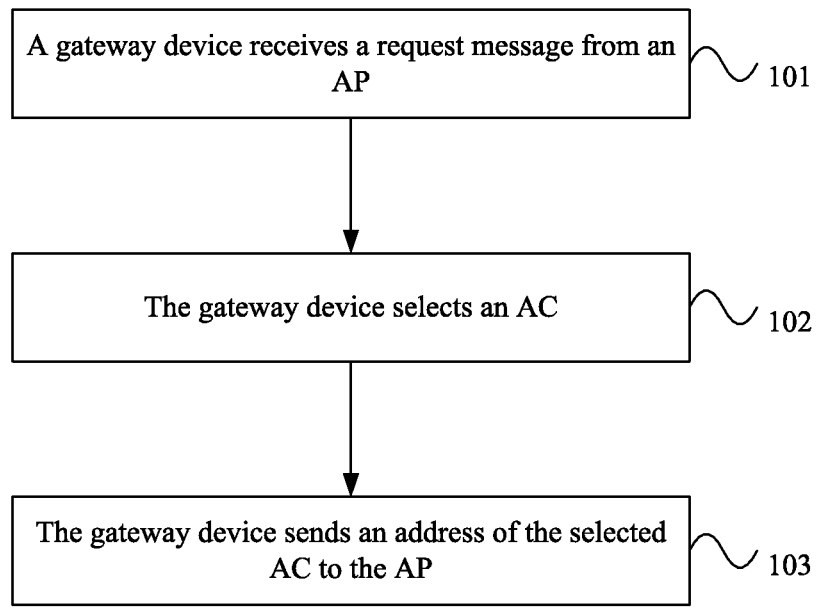
FIG. 1 is a schematic flowchart of an address processing method according to an embodiment of the present invention.

FIG. 1 is a schematic flowchart of an address processing method according to an embodiment of the present invention. As shown in FIG. 1, the address processing method provided in this embodiment may include the following.

101. A gateway device receives a request message from an AP.

Optionally, the foregoing request message from the AP may include address of AC. The address of the AC are address of AC configured on the AP.

Optionally, the request message from the AP may also include indication information used to request address of AC.

102. The gateway device selects an AC.

The gateway device may pre-configure address of AC, so that the gateway device can select an AC according to the pre-configured address of the AC.

For example, the gateway device may detect (for example, PING) the address of each AC on a timed basis, and thereby obtaining the working state of each AC.

Specifically, the gateway device may select an AC whose working state is a normal state according to the working states of the ACs. For example, the gateway device obtains working states of an AC 1, an AC 2, an AC 3, an AC 4, and an AC 5, where the working states of the AC 1, the AC2, the AC 3, and the AC 4 are normal states and the working state of the AC 5 is an abnormal state (for example, faulty). The gateway device selects one of the AC 1, the AC 2, the AC 3, and the AC 4 according to the working states of the AC 1, the AC 2, the AC 3, the AC 4, and the AC 5. The specific selection policy may be a polling selection. If only one AC is configured on the gateway device, the gateway directly selects the AC.

Optionally, the gateway device may further select an AC whose working state is a normal state and whose service processing capability is the highest according to the working states and service processing capabilities (that is, remaining service processing capabilities) of the ACs, so that the service processing capability of the selected AC is the highest, thereby implementing load balancing among the ACs. For example, the gateway device obtains the working states and service processing capabilities of the AC 1, the AC 2, the AC 3, the AC 4, and the AC 5, where the working states of the AC 1, the AC 2, the AC 3, and the AC 4 are normal states and the working state of the AC 5 is an abnormal state (for example, faulty), and the service processing capabilities of the AC 1, the AC 2, the AC 3, the AC 4, and the AC 5 are 10, 20, 15, 12, and 30 respectively. Therefore, the gateway device selects the AC 2 with the highest service processing capability from the AC 1, the AC 2, the AC 3, and the AC 4 according to the working states of the AC 1, the AC 2, the AC 3, the AC 4, and the AC 5.

Optionally, before 102, the gateway device may further determine whether the working states of the ACs corresponding to the address of the AC included in the request message from the AP are normal states; and if not, that is, if the working states of the ACs are abnormal states, 102 is performed.

Optionally, before 102, the gateway device may further determine whether the working states of the ACs corresponding to the address of the AC included in the request message from the AP are normal states. If the working states of the ACs are normal states, the gateway device further determines whether the ACs have service processing capabilities. If the ACs do not have service processing capabilities, step 102 is performed.

Optionally, before the gateway device determines whether the working states of the ACs corresponding to the address of the AC included in the request message from the AP are normal states, the gateway device may further determine whether the address of the AC included in the request message received from the AP are legal. If the address of the AC is legal, the gateway device determines whether the working states of the ACs corresponding to the address of the AC are normal states. If the address of the AC are illegal, 102 is directly performed.

103. The gateway device sends an address of the selected AC to the AP.

Optionally, in 101, the gateway device may receive a first GPRS tunneling protocol for control plane (GTPC) message from the AP, where the first GTPC message includes indication information used to request address of AC or includes address of AC. The first GTPC message may be a create PDP context request (Create PDP Context Request) message sent by the AP to a GGSN, a create session request (Create Session Request) message sent by the AP to a P-GW, and the like. Specifically, a protocol configuration options (Protocol Configuration Options, PCO) information element of the first GTPC message may be extended to include the indication information in the first GTPC message. For example, a container identifier (Container ID) is extended to be 0011H (indicating a request for IPv4 address of the AC); in another example, a container identifier (Container ID) is extended to be 0012H (indicating a request for IPv6 address of the AC).

Accordingly, in 103, the gateway device may send a second GTPC message to the AP, where the second GTPC message includes an address of the selected AC. The second GTPC message may be a create PDP context response (Create PDP Context Response) message sent by the GGSN to the AP, a create session response (Create Session Response) message sent by the P-GW to the AP, and the like. Specifically, a PCO information element of the second GTPC message may be extended to include the address of the AC selected by the gateway device in the second GTPC message. For example, a container identifier (Container ID) is extended to be 0011H (indicating an IPv4 address of the AC); in another example, a container identifier (Container ID) is extended to be 0012H (indicating an IPv6 address of the AC).

Optionally, in 101, the gateway device may receive a first mobile IP (Mobile IP, MIP) message from the AP, where the first MIP message includes indication information used to request address of AC or includes address of AC. The first MIP message may be a MIP registration request (MIP Registration Request) message and the like sent by the AP to an HA. Specifically, a vendor specific options (VSO) information element of the first MIP message may be extended to include the indication information in the first MIP message. For example, a sub-type (Sub-Type) is extended to be 11H (indicating a request for IPv4 address of the AC). In another example, a sub-type (Sub-Type) is extended to be 12H (indicating a request for IPv6 address of the AC).

Accordingly, in 103, the gateway device may send a second MIP message to the AP, where the second MIP message includes an address of the selected AC. The second MIP message may be a MIP registration response (MIP Registration Response) message and the like sent by the HA to the AP. Specifically, a VSO information element of the second MIP message may be extended to include the address of the AC selected by the gateway device in the second MIP message. For example, a sub-type (Sub-Type) is extended to be 11H (indicating an IPv4 address of the AC). In another example, a sub-type (Sub-Type) is extended to be 12H (indicating an IPv6 address of the AC).

Optionally, in 101, the gateway device may receive a CAPWAP tunnel establishment message sent by the AP, where the CAPWAP tunnel establishment message includes address of AC configured on the AP, and the gateway device determines whether to select an AC whose working state is a normal state (that is, another AC different from the ACs) according to the working states of the ACs configured on the AP (that is, the ACs corresponding to the address of the AC configured on the AP) included in the CAPWAP tunnel establishment message. It is understandable that the gateway device may identify whether the currently received message is the CAPWAP tunnel establishment message according to a transmission port receiving the message.

In this embodiment, after a gateway device receives a request message from an AP, the gateway device selects an AC and sends an address of the selected AC to the AP, so that the AP can establish a CAPWAP tunnel with the AC selected by the gateway device. In this way, problems such as complex operations and frequent errors caused by manual address configuration on the AP in the prior art can be avoided, thereby increasing the efficiency and reliability of obtaining an address of an AC by the AP.

Figure 2:
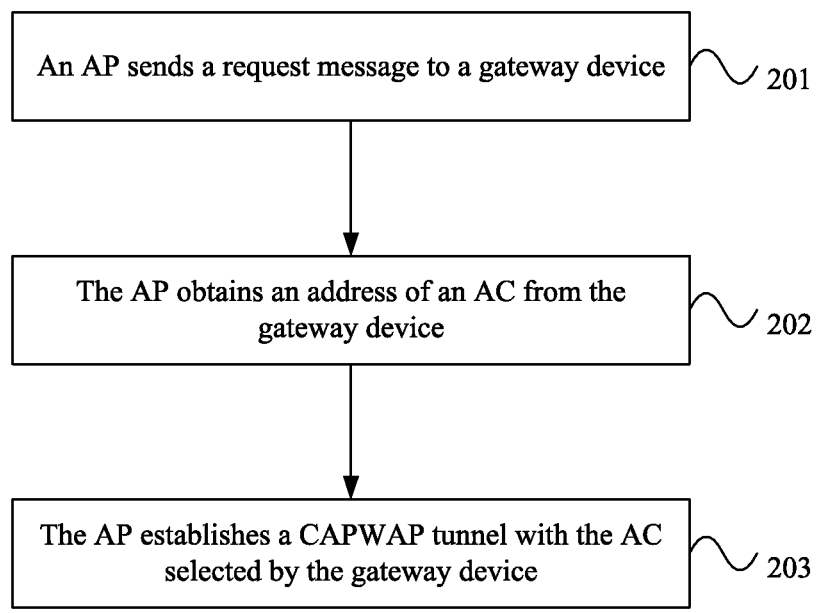
FIG. 2 is a schematic flowchart of an address processing method according to another embodiment of the present invention.

FIG. 2 is a schematic flowchart of an address processing method according to another embodiment of the present invention. As shown in FIG. 2, the address processing method provided in this embodiment may include the following steps.

201. An AP sends a request message to a gateway device.

Optionally, the request message sent by the AP to the gateway device may include address of AC. The address of the AC are address of AC configured on the AP.

Optionally, the request message sent by the AP to the gateway device may also include indication information used to request address of AC.

202. The AP obtains an address of an AC from the gateway device, where the address of the AC is an address of an AC selected by the gateway device.

The gateway device may pre-configure address of AC, so that the gateway device can select an AC according to the pre-configured address of the AC.

Specifically, the gateway device may select an AC whose working state is a normal state according to the working states of the ACs. For example, the gateway device obtains working states of an AC 1, an AC 2, an AC 3, an AC 4, and an AC 5, where the working states of the AC 1, the AC2, the AC 3, and the AC 4 are normal states and the working state of the AC 5 is an abnormal state (for example, faulty). The gateway device selects one of the AC 1, the AC 2, the AC 3, and the AC 4 according to the working states of the AC 1, the AC 2, the AC 3, the AC 4, and the AC 5. The specific selection policy may be a polling selection. If only one AC is configured on the gateway device, the gateway directly selects the AC.

Optionally, the gateway device may further select an AC whose working state is a normal state and whose service processing capability is the highest according to the working states and service processing capabilities (that is, remaining service processing capabilities) of the ACs, so that the service processing capability of the selected AC is the highest, thereby implementing load balancing among the ACs. For example, the gateway device obtains the working states and service processing capabilities of the AC 1, the AC 2, the AC 3, the AC 4, and the AC 5, where the working states of the AC 1, the AC 2, the AC 3, and the AC 4 are normal states and the working state of the AC 5 is an abnormal state (for example, faulty), and the service processing capabilities of the AC 1, the AC 2, the AC 3, the AC 4, and the AC 5 are 10, 20, 15, 12, and 30 respectively. Therefore, the gateway device selects the AC 2 with the highest service processing capability from the AC 1, the AC 2, the AC 3, and the AC 4 according to the working states of the AC 1, the AC 2, the AC 3, the AC 4, and the AC 5.

For details about how to select an AC by the gateway device, reference may be made to the related content in the embodiment corresponding to FIG. 1, which is not further described herein.

203. The AP establishes a CAPWAP tunnel with the AC selected by the gateway device.

Optionally, in 201, the AP may send a first GTPC message to the gateway device, where the first GTPC message includes indication information used to request address of AC or includes address of AC. The first GTPC message may be a create PDP context request (Create PDP Context Request) message sent by the AP to a GGSN, a create session request (Create Session Request) message sent by the AP to a P-GW, and the like. Specifically, a PCO information element of the first GTPC message may be extended to include the indication information in the first GTPC message. For example, a container identifier (Container ID) is extended to be 0011H (indicating a request for IPv4 address of the AC); in another example, a container identifier (Container ID) is extended to be 0012H (indicating a request for IPv6 address of the AC).

Accordingly, in 202, the AP may receive a second GTPC message sent by the gateway device, where the second GTPC message includes an address of the AC selected by the gateway device. The second GTPC message may be a create PDP context response (Create PDP Context Response) message sent by the GGSN to the AP, a create session response (Create Session Response) message sent by the P-GW to the AP, and the like. Specifically, a PCO information element of the second GTPC message may be extended to include the address of the AC selected by the gateway device in the second GTPC message. For example, a container identifier (Container ID) is extended to be 0011H (indicating an IPv4 address of the AC); in another example, a container identifier (Container ID) is extended to be 0012H (indicating an IPv6 address of the AC).

Optionally, in 201, the AP may send a first MIP message to the gateway device, where the first MIP message includes indication information used to request address of AC or includes address of AC. The first MIP message may be a MIP registration request (MIP Registration Request) message and the like sent by the AP to an HA. Specifically, a VSO information element of the first MIP message may be extended to include the indication information in the first MIP message. For example, a sub-type (Sub-Type) is extended to be 11H (indicating a request for IPv4 address of the AC). In another example, a sub-type (Sub-Type) is extended to be 12H (indicating a request for IPv6 address of the AC).

Accordingly, in 202, the AP may receive a second MIP message sent by the gateway device, where the second MIP message includes an address of the AC selected by the gateway device. The second MIP message may be a MIP registration response (MIP Registration Response) message and the like sent by the HA to the AP. Specifically, a VSO information element of the second MIP message may be extended to include the address of the AC selected by the gateway device in the second MIP message. For example, a sub-type (Sub-Type) is extended to be 11H (indicating an IPv4 address of the AC). In another example, a sub-type (Sub-Type) is extended to be 12H (indicating an IPv6 address of the AC).

Optionally, in 201, the AP may send a CAPWAP tunnel establishment message to the gateway device, where the CAPWAP tunnel establishment message includes address of AC configured on the AP, so that the gateway device determines whether to select an AC whose working state is a normal state (that is, another AC different from the ACs)

according to the working states of the ACs configured on the AP (that is, the ACs corresponding to the address of the AC configured on the AP) included in the CAPWAP tunnel establishment message, and sends the address of the selected AC to the AP. It is understandable that the gateway device may identify whether the currently received message is the CAPWAP tunnel establishment message according to a transmission port receiving the message. It is understandable that the gateway device may identify whether the currently received message is the CAPWAP tunnel establishment message according to a transmission port receiving the message.

In this embodiment, after an AP sends a request message to a gateway device, the gateway device selects an AC and sends an address of the selected AC to the AP, so that the AP can establish a CAPWAP tunnel with the AC selected by the gateway device. In this way, problems such as complex operations and frequent errors caused by manual address configuration on the AP in the prior art can be avoided, thereby increasing the efficiency and reliability of obtaining an address of an AC by the AP.

Figure 3:
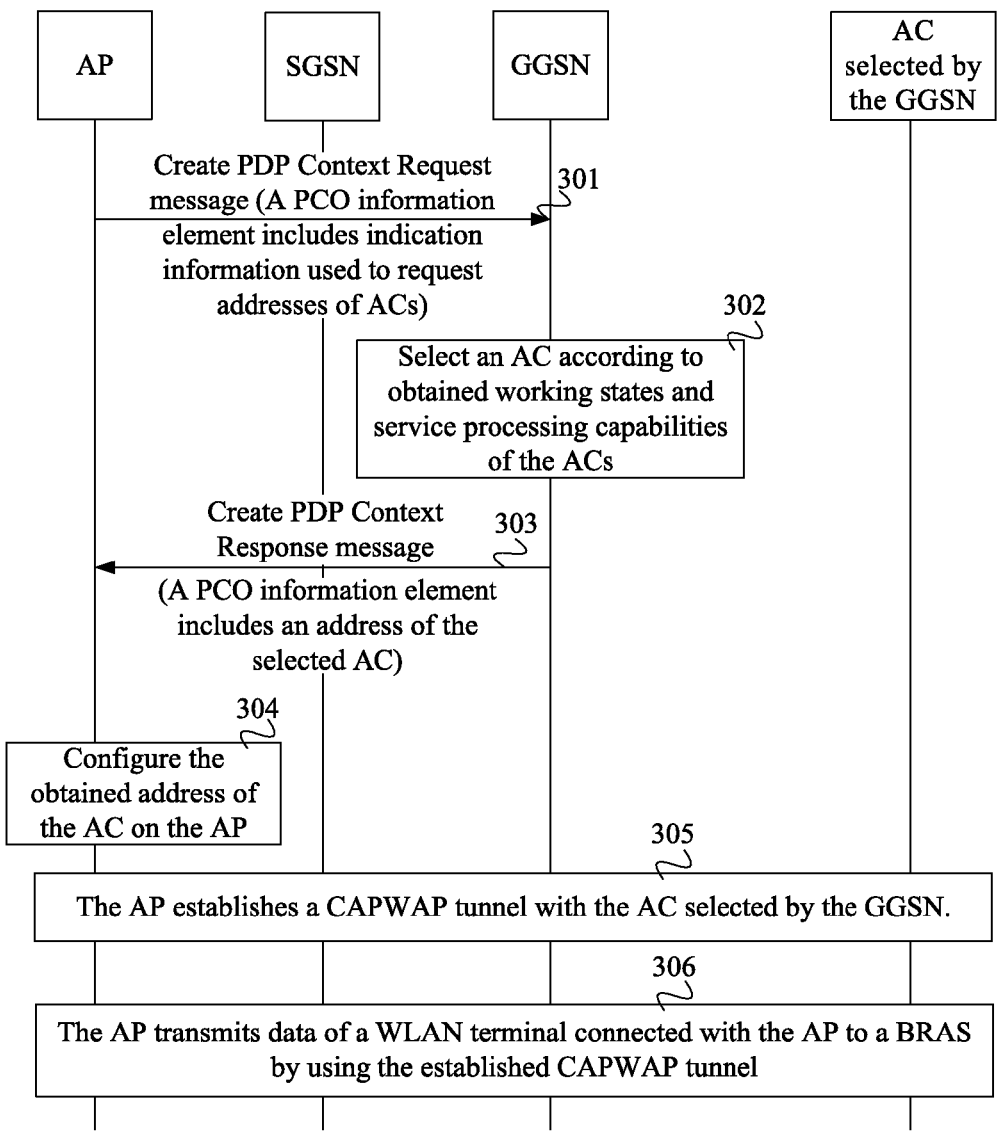
FIG. 3 is a schematic flowchart of an address processing method according to another embodiment of the present invention.

For better understanding of the method provided in embodiments of the present invention, the following uses a WCDMA network as an example. FIG. 3 is a schematic flowchart of an address processing method according to another embodiment of the present invention. As shown in FIG. 3, the address processing method provided in this embodiment may include the following steps.

301. An AP sends a create PDP context request (Create PDP Context Request) message to a GGSN through a serving GPRS support node (Serving GPRS Supporting Node, SGSN), where a PCO information element of the message includes indication information used to request address of AC.

For example, in an activation procedure, the AP may send the foregoing create PDP context request message to the GGSN through the SGSN.

302. The GGSN selects an AC according to obtained working states and service processing capabilities of the ACs.

For example, the GGSN selects an AC whose working state is a normal state and whose service processing capability is the highest.

303. The GGSN sends a create PDP context response (Create PDP Context Response) message to the AP through the SGSN, where a PCO information element of the message includes an address of the AC selected by the GGSN.

304. The AP configures the obtained address of the AC on the AP.

305. The AP establishes a CAPWAP tunnel with the AC selected by the GGSN.

The CAPWAP is a tunneling protocol whose packets may include control packets and data packets.

306. The AP transmits data of a WLAN terminal connected to the AP to a broadband remote access server (Broadband Remote Access Server, BRAS) by using the established CAPWAP tunnel to implement access services of the WLAN terminal.

In this embodiment, after a GGSN receives a create PDP context request message from an AP, the GGSN selects an AC according to obtained working states and service processing capabilities of ACs and sends an address of the selected AC to the AP, so that the AP can establish a CAPWAP tunnel with the AC selected by the GGSN. In this way, problems such as complex operations and frequent errors caused by manual address configuration on the AP in the prior art can be avoided, thereby increasing the efficiency and reliability of obtaining an address of an AC by the AP. In addition, the gateway device selects an AC according to service processing capabilities of the ACs, so that an AC can be selected in a balanced manner, thereby further implementing load balancing among the ACs.

Figure 4:
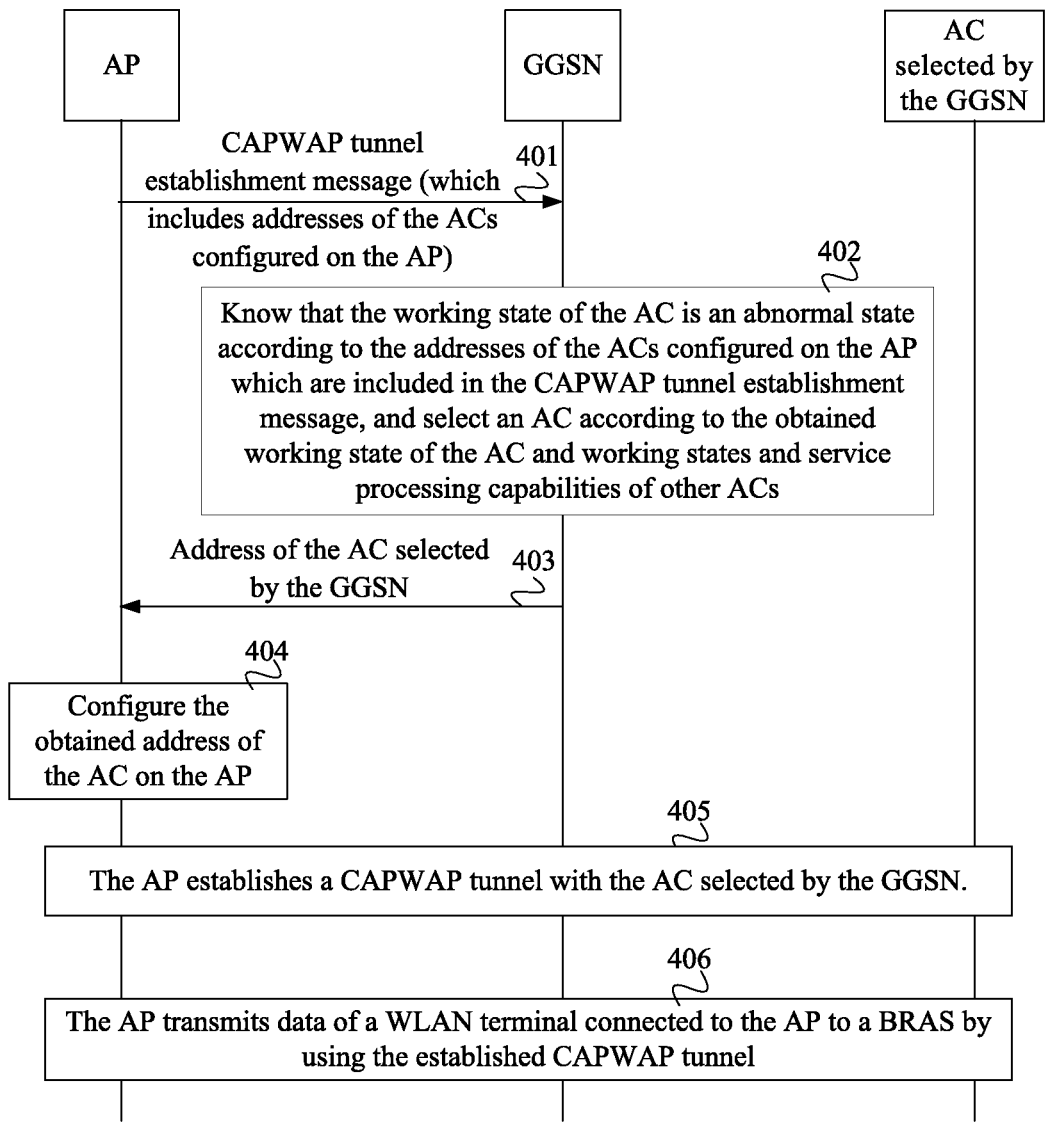
FIG. 4 is a schematic flowchart of an address processing method according to another embodiment of the present invention.

FIG. 4 is a schematic flowchart of an address processing method according to another embodiment of the present invention. As shown in FIG. 4, the address processing method provided in this embodiment may include the following steps.

401. An AP sends a CAPWAP tunnel establishment message to an AC through a GGSN according to address of AC configured on the AP, where the CAPWAP tunnel establishment message includes the foregoing configured address of the AC.

For example, after the AP is activated successfully, the AP may send a CAPWAP tunnel establishment message to the AC through the GGSN.

402. The GGSN knows that the working state of the AC is an abnormal state according to the foregoing configured address of the AC included in the CAPWAP tunnel establishment message, and selects an AC according to the obtained working state of the AC and working states and service processing capabilities of other ACs, for example, an AC whose working state is a normal state and whose service processing capability is the highest.

Optionally, the GGSN may further discard the CAPWAP tunnel establishment message.

403. The GGSN sends an address of the AC selected by the GGSN to the AP.

404. The AP configures the obtained address of the AC on the AP.

405. The AP establishes a CAPWAP tunnel with the AC selected by the GGSN.

The CAPWAP is a tunneling protocol whose packets may include control packets and data packets.

406. The AP transmits data of a WLAN terminal connected to the AP to a BRAS device by using the established CAPWAP tunnel to implement access services of the WLAN terminal.

In this embodiment, after an AP sends a CAPWAP tunnel establishment message to a GGSN, if working states of ACs corresponding to address of AC configured on the AP which are included in the CAPWAP tunnel establishment message are abnormal states, the GGSN selects an AC according to the obtained working states and service processing capabilities of the ACs and sends an address of the selected AC to the AP, so that the AP can establish a CAPWAP tunnel with the AC selected by the GGSN. In this way, problems such as complex operations and frequent errors caused by manual address configuration on the AP in the prior art can be avoided, thereby increasing the efficiency and reliability of obtaining an address of an AC by the AP. In addition, the gateway device selects an AC according to service processing capabilities of the ACs, so that an AC can be selected in a balanced manner, thereby further implementing load balancing among the ACs.

It should be noted that, for brevity, the foregoing method embodiments are represented as a series of actions. However, persons skilled in the art should understand that the present invention is not limited to the order of the described actions, because according to the present invention, some steps may adopt other orders or occur simultaneously. It should be further understood by persons skilled in the art that the described embodiments in the specification all belong to exemplary embodiments, and the involved actions and modules are not necessarily required by the present invention.

In the foregoing embodiments, the description of each of the embodiments has respective focuses. For a part that is not described in detail in a certain embodiment, reference may be made to related descriptions in other embodiments.

Figure 5:
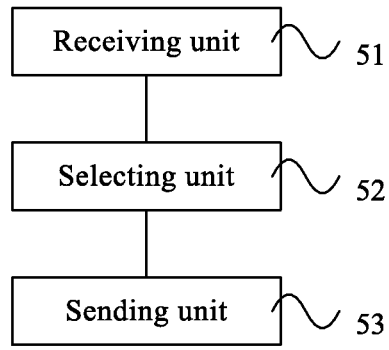
FIG. 5 is a schematic structural diagram of a gateway device according to another embodiment of the present invention.

FIG. 5 is a schematic structural diagram of a gateway device according to another embodiment of the present invention. As shown in FIG. 5, the gateway device provided in this embodiment may include a receiving unit 51, a selecting unit 52, and a sending unit 53. The receiving unit 51 is adapted to receive a request message from an AP; the selecting unit 52 is adapted to select an AC; and the sending unit 53 is adapted to send an address of the AC selected by the selecting unit 52 to the AP.

Functions of the gateway device provided in the embodiment corresponding to FIG. 1 and the GGSN provided in the embodiments corresponding to FIG. 3 and FIG. 4 may be implemented by the gateway device provided in this embodiment.

Figure 6:
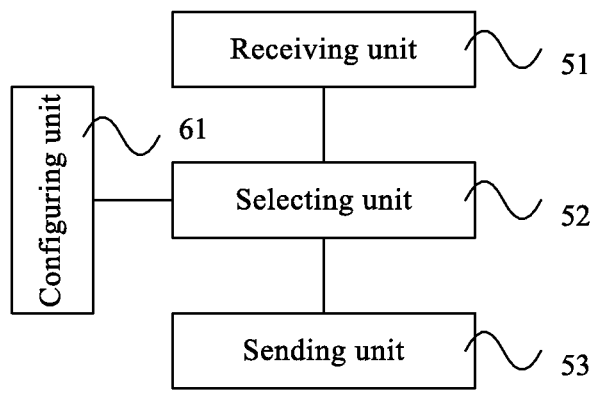
FIG. 6 is a schematic structural diagram of a gateway device according to another embodiment of the present invention.

Further, as shown in FIG. 6, the gateway device provided in this embodiment may further include a configuring unit 61 adapted to pre-configure address of AC. Accordingly, the selecting unit 52 may be specifically adapted to select an AC according to the address of the AC pre-configured by the configuring unit 61.

Specifically, the selecting unit 52 provided in this embodiment may specifically select an AC whose working state is a normal state and whose service processing capability is the highest according to working states and service processing capabilities of the ACs.

Optionally, the request message received by the receiving unit 51 from the AP may include indication information used to request address of AC.

Figure 7:
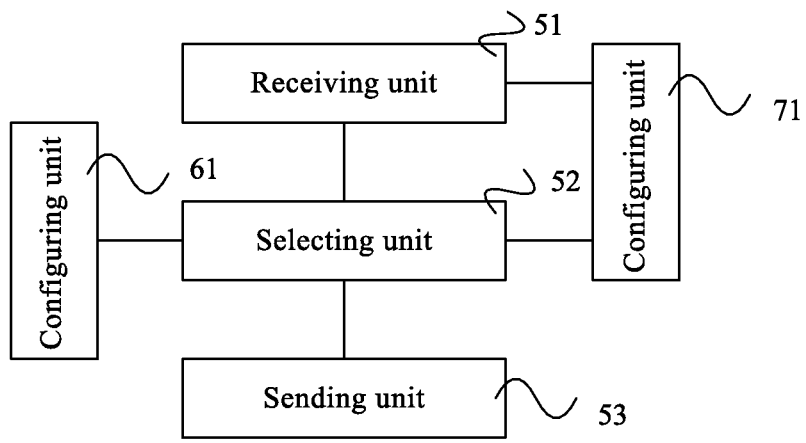
FIG. 7 is a schematic structural diagram of a gateway device according to another embodiment of the present invention.

Optionally, the request message received by the receiving unit 51 from the AP may also include address of AC, where the address of the AC are address of AC configured on the AP. Accordingly, as shown in FIG. 7, the gateway device provided in this embodiment may further include a determining unit 71, which may be adapted to: determine whether the working states of the ACs corresponding to the address of the AC included in the request message from the AP are normal states, and if the working states of the ACs are abnormal states, trigger the selecting unit 52 to select an AC; or may be further adapted to determine whether the working states of the ACs corresponding to the address of the AC included in the request message from the AP are normal states, and if the working states of the ACs are normal states, determine whether the ACs have service processing capabilities, and if the ACs do not have service processing capabilities, trigger the selecting unit 52 to select an AC.

Further, the determining unit 71 may further determine whether the address of the AC included in the request message from the AP are legal; if the address of the AC are legal, determine whether the working states of the ACs corresponding to the address of the AC included in the request message from the AP are normal states; and if the address of the AC are illegal, trigger the selecting unit 52 to select an AC.

For example, the receiving unit 51 may specifically receive a first GTPC message sent by the AP, where the first GTPC message includes indication information used to request address of AC or includes address of AC. Accordingly, the sending unit 53 may specifically send a second GTPC message to the AP, where the second GTPC message includes an address of the AC selected by the selecting unit.

In another example, the receiving unit 51 may specifically further receive a first MIP message sent by the AP, where the first MIP message includes indication information used to request address of AC or includes address of AC. Accordingly, the sending unit 53 may specifically send a second MIP message to the AP, where the second MIP message includes an address of the AC selected by the selecting unit.

In another example, the receiving unit 51 may specifically further receive a CAPWAP tunnel establishment message sent by the AP, where the CAPWAP tunnel establishment message includes address of AC configured on the AP. It is understandable that the receiving unit 51 may further identify whether the currently received message is the CAPWAP tunnel establishment message according to a transmission port receiving the message.

In this embodiment, after the receiving unit receives a request message from an AP, a selecting unit selects an AC, and the sending unit sends an address of the selected AC to the AP, so that the AP can establish a CAPWAP tunnel with the AC selected by the gateway device. In this way, problems such as complex operations and frequent errors caused by manual address configuration on the AP in the prior art can be avoided, thereby increasing the efficiency and reliability of obtaining an address of an AC by the AP.

Figure 8:
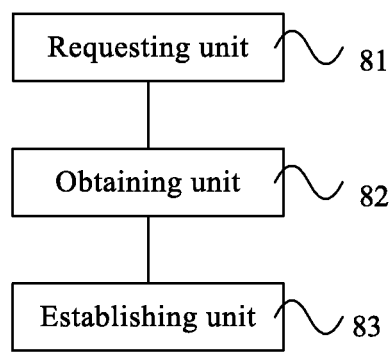
FIG. 8 is a schematic structural diagram of an AP according to another embodiment of the present invention.

FIG. 8 is a schematic structural diagram of an AP according to another embodiment of the present invention. As shown in FIG. 8, the AP provided in this embodiment may include a requesting unit 81, an obtaining unit 82, and an establishing unit 83. The requesting unit 81 is adapted to send a request message to a gateway device; the obtaining unit 82 is adapted to obtain an address of an AC from the gateway device, where the address of the AC is an address of an AC selected by the gateway device; and the establishing unit 83 is adapted to establish a CAPWAP tunnel with the AC selected by the gateway device.

Functions of the AP in embodiments corresponding to FIG. 2, FIG. 3, and FIG. 4 may be implemented by the AP provided in this embodiment.

Optionally, the request message sent by the requesting unit 81 to the gateway device may include address of AC, where the address of the AC are address of AC configured on the AP.

Optionally, the request message sent by the requesting unit 81 to the gateway device may also include indication information used to request address of AC.

For example, the requesting unit 81 may specifically send a first GTPC message to the gateway device, where the first GTPC message includes indication information used to request address of AC or includes address of AC. Accordingly, the obtaining unit 82 may specifically receive a second GTPC message sent by the gateway device, where the second GTPC message includes an address of the AC selected by the gateway device.

For example, the requesting unit 81 may specifically further send a first MIP message to the gateway device, where the first MIP message includes indication information used to request address of AC or includes address of AC. Accordingly, the obtaining unit 82 may specifically receive a second MIP message sent by the gateway device, where the second MIP message includes an address of the AC selected by the gateway device.

In another example, the requesting unit 81 may specifically further send a CAPWAP tunnel establishment message to the gateway device, where the CAPWAP tunnel establishment message includes address of AC configured on the AP.

In this embodiment, after a requesting unit sends a request message to a gateway device, the gateway device selects an AC and sends an address of the selected AC to an obtaining unit, so that an establishing unit can establish a CAPWAP tunnel with the AC selected by the gateway device. In this way, problems such as complex operations and frequent errors caused by manual address configuration on the AP in the prior art can be avoided, thereby increasing the efficiency and reliability of obtaining an address of an AC by the AP.

It may be clearly understood by persons skilled in the art that, for the purpose of convenient and brief description, for a detailed working process of the foregoing system, apparatus and unit, reference may be made to the corresponding process in the method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other divisions in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of steps of the methods described in the embodiments of the present invention. The storage medium includes: any medium that can store program codes, such as a USB flash disk, a removable hard disk, a read-only memory (ROM, Read-Only Memory), a random access memory (RAM, Random Access Memory), a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solution described in the foregoing embodiments or make equivalent replacements to some technical features thereof, as long as such modifications or replacements do not cause the essence of corresponding technical solutions to depart from the spirit and scope of the technical solution of the embodiments of the present invention.

What is claimed is:

1. An address processing method, comprising:
   receiving, by a gateway device, a request message from a wireless access point (AP);
   selecting, by the gateway device, an access controller (AC) from a plurality of ACs according to a working state of the AC; and
   sending, by the gateway device, an address of the selected AC to the AP.

2. The method according to claim 1, further comprising pre-configuring, by the gateway device, an address of one of the plurality of ACs, wherein selecting the AC further comprises selecting the AC from the plurality of ACs according to the pre-configured address of the AC.

3. The method according to claim 1, wherein selecting the AC further comprises selecting a service processing capability of the AC whose working state is a normal state and whose service processing capability is highest according to working states and service processing capabilities of the plurality of ACs.

4. The method according to claim 1, wherein the request message from the AP comprises addresses of ACs.

5. The method according to claim 4, wherein before selecting the AC, the method further comprises:
   determining, by the gateway device, whether working states of the ACs corresponding to the addresses of the ACs comprised in the request message from the AP are normal states or abnormal states;
   when the working states of the ACs are abnormal states, performing the step of selecting the AC; and
   when the working states of the ACs are normal states, determining whether the ACs have service processing capabilities and, if the ACs do not have service processing capabilities, performing the step of selecting the AC.

6. The method according to claim 1, wherein the request message from the AP comprises indication information used to request the address of the AC.

7. The method according to claim 1, wherein:
   receiving the request message from the AP comprises receiving, by the gateway device, a first general packet radio service tunneling protocol for control plane (GTPC) message sent by the AP; and
   sending the address of the selected AC to the AP comprises sending, by the gateway device, a second GTPC message to the AP, wherein the second GTPC message comprises the address of the selected AC.

8. The method according to claim 1, wherein receiving the request message from the AP comprises receiving a control and provisioning of wireless access points tunnel establishment message sent by the AP.

9. An address processing method, comprising:
   sending, by a wireless access point (AP), a request message to a gateway device;
   obtaining, by the AP, an address of an access controller (AC) from the gateway device, wherein the address of the AC is the address of the AC selected by the gateway device from a plurality of ACs according to a working state of the AC; and
   establishing, by the AP, a control and provisioning of wireless access points tunnel with the AC selected by the gateway device.

10. The method according to claim 9, wherein the request message sent by the AP to the gateway device comprises the address of the AC.

11. The method according to claim 9, wherein the request message sent by the AP to the gateway device comprises indication information used to request the address of the AC.

12. The method according to claim 9, wherein:
   sending the request message to the gateway device comprises sending a first general packet radio service tunneling protocol for control plane (GTPC) message to the gateway device; and
   obtaining the address of the AC from the gateway device comprises receiving a second GTPC message sent by the gateway device, wherein the second GTPC message comprises the address of the AC selected by the gateway device.

13. A gateway device, comprising:
a receiver, configured to receive a request message from a wireless access point (AP);
a processor;
a computer-readable storage medium storing a program to be executed by the processor, the program including instructions for selecting an access controller (AC) from a plurality of ACs according to a working state of the AC; and
a transmitter, configured to send an address of the AC selected by the program to the AP.

14. The gateway device according to claim 13, wherein the program further includes instructions for pre-configuring the address of the AC and selecting the AC according to the pre-configured address of the AC.

15. The gateway device according to claim 13, wherein the program further includes instructions for selecting a service processing capability of the AC whose working state is a normal state and whose service processing capability is highest according to working states and service processing capabilities of the plurality of ACs.

16. The gateway device according to claim 13, wherein the request message from the AP comprises addresses of ACs, wherein the addresses of the ACs are addresses of the ACs configured on the AP, and wherein the program further includes instructions for:
determining whether working states of the ACs corresponding to the addresses of the ACs comprised in the request message from the AP are normal states;
when the working states of the ACs are abnormal states, selecting the AC; and
when the working states of the ACs are normal states, determine whether the ACs have service processing capabilities and, if the ACs do not have service processing capabilities, selecting the AC.

17. The gateway device according to claim 16, wherein the program further includes instructions for determining whether the addresses of the ACs comprised in the request message from the AP are legal, for determining whether the working states of the ACs corresponding to the addresses of the ACs comprised in the request message from the AP are normal states when the addresses of the AC are legal and for selecting the AC when the addresses of the ACs are illegal.

18. The gateway device according to claim 13, wherein the request message from the AP comprises indication information used to request the address of the AC.

19. The gateway device according to claim 13, wherein the receiver is specifically configured to receive a first general packet radio service tunneling protocol for control plane GTPC message sent by the AP; and
wherein the transmitter is specifically configured to send a second GTPC message to the AP, wherein the second GTPC message comprises the address of the selected AC.

20. A wireless access point, comprising:
a transmitter, configured to send a request message to a gateway device;
a receiver, configured to receive an address of an access controller from the gateway device, wherein the address of the access controller is the address of the access controller selected by the gateway device from a plurality of access controllers according to a working state of the access controller;
a processor; and
a computer-readable storage medium storing a program to be executed by the processor, the program including instructions for establishing a control and provisioning of wireless access points tunnel with the access controller selected by the gateway device.

* * * * *